(12) United States Patent
Zavesky et al.

(10) Patent No.: US 11,556,961 B2
(45) Date of Patent: Jan. 17, 2023

(54) TECHNIQUES FOR REAL-TIME OBJECT CREATION IN EXTENDED REALITY ENVIRONMENTS

(71) Applicant: AT&T Intellectual Property I, L.P., Atlanta, GA (US)

(72) Inventors: Eric Zavesky, Austin, TX (US); James Pratt, Round Rock, TX (US); James Jackson, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 81 days.

(21) Appl. No.: 16/937,114

(22) Filed: Jul. 23, 2020

(65) Prior Publication Data

US 2022/0027956 A1 Jan. 27, 2022

(51) Int. Cl.
*G06Q 30/02* (2012.01)
*G02B 27/01* (2006.01)
*G06V 20/20* (2022.01)

(52) U.S. Cl.
CPC ..... *G06Q 30/0271* (2013.01); *G02B 27/0172* (2013.01); *G06Q 30/0267* (2013.01); *G06V 20/20* (2022.01)

(58) Field of Classification Search
CPC .......... G06Q 30/0271; G06Q 30/0267; G02B 27/0172; G06V 20/20; G06V 10/764; G06V 20/00; G06T 7/00; G06T 2200/24; G06T 11/60
See application file for complete search history.

(56) References Cited

U.S. PATENT DOCUMENTS

| | | | |
|---|---|---|---|
| 10,580,218 B1 * | 3/2020 | Viner | G06T 19/006 |
| 2008/0313038 A1 * | 12/2008 | Wajihuddin | G06Q 30/02 |
| | | | 705/14.41 |
| 2012/0206322 A1 * | 8/2012 | Osterhout | G02B 27/0093 |
| | | | 345/8 |

(Continued)

OTHER PUBLICATIONS

M. S. Elbamby, C. Perfecto, M. Bennis and K. Doppler, "Toward Low-Latency and Ultra-Reliable Virtual Reality," in IEEE Network, vol. 32, No. 2, pp. 78-84, Mar.-Apr. 2018, doi: 10.1109/MNET.2018.1700268. (Year: 2018).*

(Continued)

*Primary Examiner* — Dipen M Patel
(74) *Attorney, Agent, or Firm* — Guntin & Gust, PLC; Robert Gingher

(57) ABSTRACT

Aspects of the subject disclosure may include, for example, identifying user preferences for an XR application executing at an XR user system, wherein the user preferences are associated with an XR application user, accessing a historical profile associated with the XR application user, receiving local environment information from a sensor array of the XR user system, selecting an XR object for presentation on an XR display of the XR user system based on the local environment information, the user preferences, and the historical profile, and allocating compute resources to facilitate a rendering of the XR object, wherein the allocated compute resources are selected from a compute resource pool comprising local compute resources of the XR user system and edge compute resources of a network. Other embodiments are disclosed.

20 Claims, 8 Drawing Sheets

(56) References Cited

U.S. PATENT DOCUMENTS

| | | | | |
|---|---|---|---|---|
| 2015/0309316 | A1* | 10/2015 | Osterhout | G06F 3/03547 |
| | | | | 345/8 |
| 2016/0187654 | A1* | 6/2016 | Border | G02B 5/18 |
| | | | | 359/567 |
| 2018/0349946 | A1* | 12/2018 | Nguyen | G06Q 30/0244 |
| 2020/0051132 | A1* | 2/2020 | Zavesky | G06T 11/00 |
| 2020/0402293 | A1* | 12/2020 | Yerli | G06Q 30/0623 |
| 2021/0274235 | A1* | 9/2021 | Anderegg | H04N 21/6587 |
| 2021/0374489 | A1* | 12/2021 | Prakash | G06V 20/70 |

OTHER PUBLICATIONS

Fernández-Caramés, T.M.; Fraga-Lamas, P.; Suárez-Albela, M.; Vilar-Montesinos, M. A Fog Computing and Cloudlet Based Augmented Reality System for the Industry 4.0 Shipyard. Sensors 2018, 18, 1798. https://doi.org/10.3390/s18061798 (Year: 2018).*

W. Lo, C. Huang and C. Hsu, "Edge-Assisted Rendering of 360° Videos Streamed to Head-Mounted Virtual Reality," 2018 IEEE International Symposium on Multimedia (ISM), 2018, pp. 44-51, doi: 10.1109/ISM.2018.00016. (Year: 2018).*

M. Lim and Y. Lee, "A distributed mechanism for remote rendering of image data," 2014 International Conference on Big Data and Smart Computing (BIGCOMP), 2014, pp. 133-138, doi: 10.1109/BIGCOMP.2014.6741423. (Year: 2014).*

Mao, Yuyi, et al. "A survey on mobile edge computing: The communication perspective." IEEE communications surveys & tutorials 19.4 (2017): 2322-2358. (Year: 2017).*

* cited by examiner

TECHNIQUES FOR REAL-TIME OBJECT CREATION IN EXTENDED REALITY ENVIRONMENTS

FIELD OF THE DISCLOSURE

The subject disclosure relates to techniques for real-time object creation in extended reality (XR) environments.

BACKGROUND

In general terms, an XR application presents an alternate reality to a user by incorporating simulated objects/elements into the user's real-life environment. This may be achieved by generating visual effects on an XR display via which the user perceives the real-life environment and visual effects in combination. The computational demands associated with implementing XR objects/elements may vary, and may depend on the complexities of those objects/elements and/or the quality with which they are to be rendered.

BRIEF DESCRIPTION OF THE DRAWINGS

Reference will now be made to the accompanying drawings, which are not necessarily drawn to scale, and wherein.

DETAILED DESCRIPTION

Figure 1:
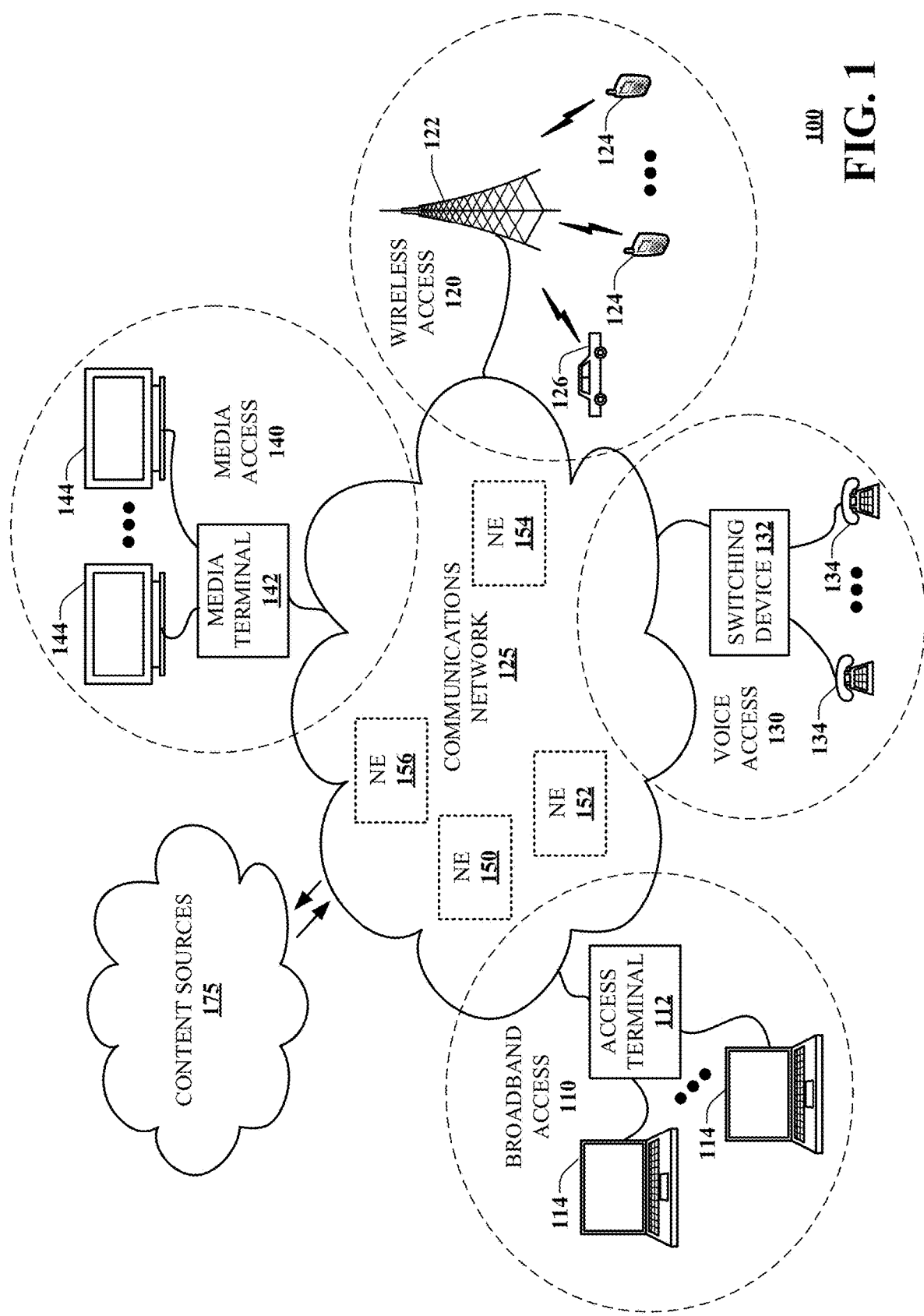
FIG. 1 is a block diagram illustrating an exemplary, non-limiting embodiment of a communications network in accordance with various aspects described herein.

The subject disclosure describes, among other things, illustrative embodiments for real-time object creation in XR environments. According to some embodiments, XR objects to be presented in an XR environment of an XR application may be dynamically selected and generated on a just-in-time basis. In some embodiments, compute resources of an edge network node may be used to perform computational tasks associated with presenting an XR object at an XR user system. In some embodiments, the real-world surroundings of such an XR system may be analyzed in order to inform the selection of XR objects to be presented and the selection of the positions within the XR environment at which those objects are to be presented. In some embodiments, preferences of an XR application user and a historical context of that XR application user may serve as bases for selection of such XR objects. Other embodiments are described in the subject disclosure.

One or more aspects of the subject disclosure include an apparatus comprising a processing system including a processor and a memory that stores executable instructions that, when executed by the processing system, facilitate performance of operations. The operations can include identifying user preferences for an XR application executing at an XR user system, wherein the user preferences are associated with an XR application user, accessing a historical profile associated with the XR application user, receiving local environment information from a sensor array of the XR user system, selecting an XR object for presentation on an XR display of the XR user system based on the local environment information, the user preferences, and the historical profile, and allocating compute resources to facilitate a rendering of the XR object, wherein the allocated compute resources are selected from a compute resource pool comprising local compute resources of the XR user system and edge compute resources of a network.

One or more aspects of the subject disclosure include a non-transitory machine-readable storage medium comprising executable instructions that, when executed by a processing system including a processor, facilitate performance of operations. The operations can include identifying user preferences for an XR application executing at an XR user system, wherein the user preferences are associated with an XR application user, accessing a historical profile associated with the XR application user, receiving local environment information from a sensor array of the XR user system, selecting an XR object for presentation on an XR display of the XR user system based on the local environment information, the user preferences, and the historical profile, and allocating compute resources to facilitate a rendering of the XR object, wherein the allocated compute resources are selected from a compute resource pool comprising local compute resources of the XR user system and edge compute resources of a network.

One or more aspects of the subject disclosure include a method. The method can include identifying, by a processing system including a processor, user preferences for an extended reality (XR) application executing at an XR user system, wherein the user preferences are associated with an XR application user, accessing, by the processing system, a historical profile associated with the XR application user, receiving, by the processing system, local environment information from a sensor array of the XR user system, selecting, by the processing system, based on the local environment information, the user preferences, and the historical profile, an XR object for presentation on an XR display of the XR user system, and allocating, by the processing system, compute resources to facilitate a rendering of the XR object, wherein the allocated compute resources are selected from a compute resource pool comprising local compute resources of the XR user system and edge compute resources of a network.

Referring now to FIG. 1, a block diagram is shown illustrating an example, non-limiting embodiment of a system 100 in accordance with various aspects described herein. For example, system 100 can facilitate in whole or in part optimal selection and generation of XR objects according the pool of immediately relevant. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2:
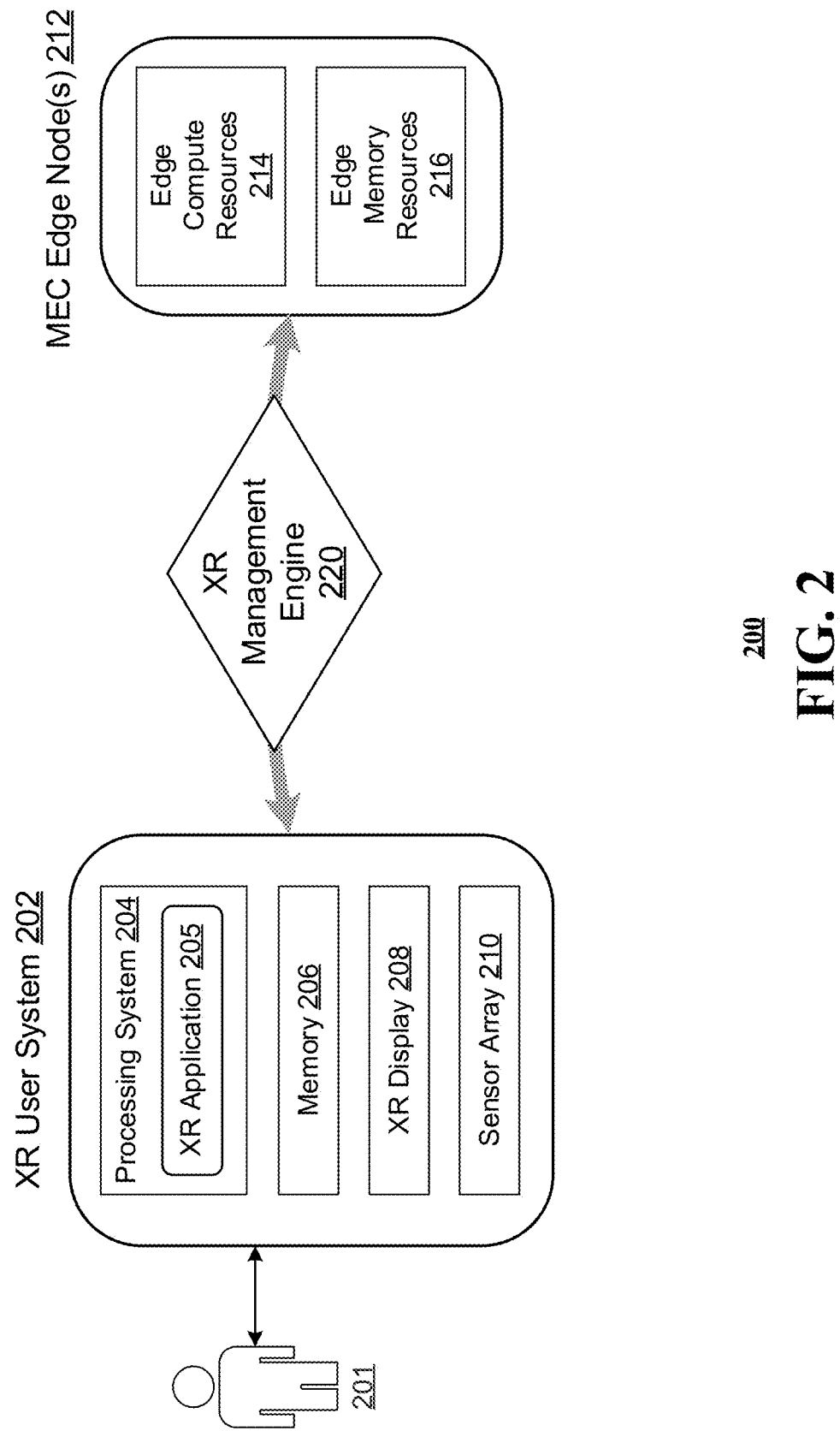
FIG. 2 is a block diagram illustrating an example, non-limiting embodiment of a first operating environment in accordance with various aspects described herein.

FIG. 2 illustrates an example of an operating environment 200 that may be representative of some embodiments. In operating environment 200, a user 201 utilizes an XR application 205 executed by an XR user system 202. As employed herein, the term "extended reality" (XR) is an umbrella term for technologies that include real-and-virtual combined environments (e.g., virtual reality, augmented reality, mixed reality, etc.) and human-machine interactions generated by computer technology and wearables. The various forms of XR can be used to make different types of immersions including video games, educational materials, training and supportive tasks, and enhancement of awareness for day-to-day on-the-job tasks.

As shown in FIG. 2, XR user system 202 can comprise a processing system 204, a memory 206, an XR display 208, and a sensor array 210. Processing system 204 may generally comprise circuitry capable of performing processing/computing operations, such as executing instructions stored in memory 206. In various embodiments, processing system 204 may include one or more processors. XR display 208 may generally comprise equipment capable of generating real-world visual effects that are perceived, from the perspective of user 201, as elements in an XR environment fashioned by XR application 205.

Sensor array 210 may include one or more sensors or other devices that measure, capture, or otherwise sense aspects of the local real-world environment of XR user system 202. In some embodiments, sensor array 210 may include one or more cameras that capture images and/or video of the surroundings of XR user system 202. In some embodiments, sensor array 210 may include one or more microphones that capture sounds that are audible at XR user system 202. In some embodiments, sensor array 210 may include one or more radio sensors that measure signal strengths of wireless signals in the vicinity of XR user system 202. Additional examples of environmental aspects that may be measured, captured, or otherwise sensed by sensor array 210 include temperature, pressure, speed, acceleration, angular velocity, humidity, light level, and magnetic field orientation and/or strength. The embodiments are not limited to these examples.

In operating environment 200, the compute resources used to fulfill computational demands associated with execution of XR application 205 may be selected from among those of a compute resource pool that includes both local and non-local compute resources. In addition to local compute resources of XR user system 202—such as may correspond to computing/processing capabilities of processing system 204—the compute resource pool for XR application 205 may include edge compute resources 214 of one or more multi-access edge computing (MEC) edge nodes 212. Similarly, memory requirements associated with the execution of XR application 205 may be fulfilled using memory resources selected from among those of a memory resource pool that includes both local and non-local memory resources. In addition to local memory resources of XR user system 202—such as may be embodied in memory 206—the memory resource pool for XR application 205 may include edge memory resources 216 of one or more MEC edge nodes 212.

An XR management engine 220 may administer the selection and allocation of resources for XR application 205, and the communication/coordination between XR user system 202 and MEC edge node(s) 212 required for this purpose. According to some embodiments, XR management engine 220 may be representative of operations/functions that are distributed across XR user system 202 and one or more other devices or systems. In some embodiments, a client-side XR management agent executing at XR user system 202 may perform some operations of XR management engine 220, while a server-side XR management agent executing on a remote server may perform other operations of XR management engine 220. The nature of the distribution of operations/functions of XR management engine 220 across XR user system 202 and the one or more other devices or systems may vary from embodiment, such that tasks of XR management engine 220 that are handled at XR user system 202 in some embodiments may be handled remotely in other embodiments. For example, resource allocation operations of XR management engine 220 may be conducted at XR user system 202 by processing system 204 in some embodiments, and may be conducted at a remote server in other embodiments.

Figure 3:
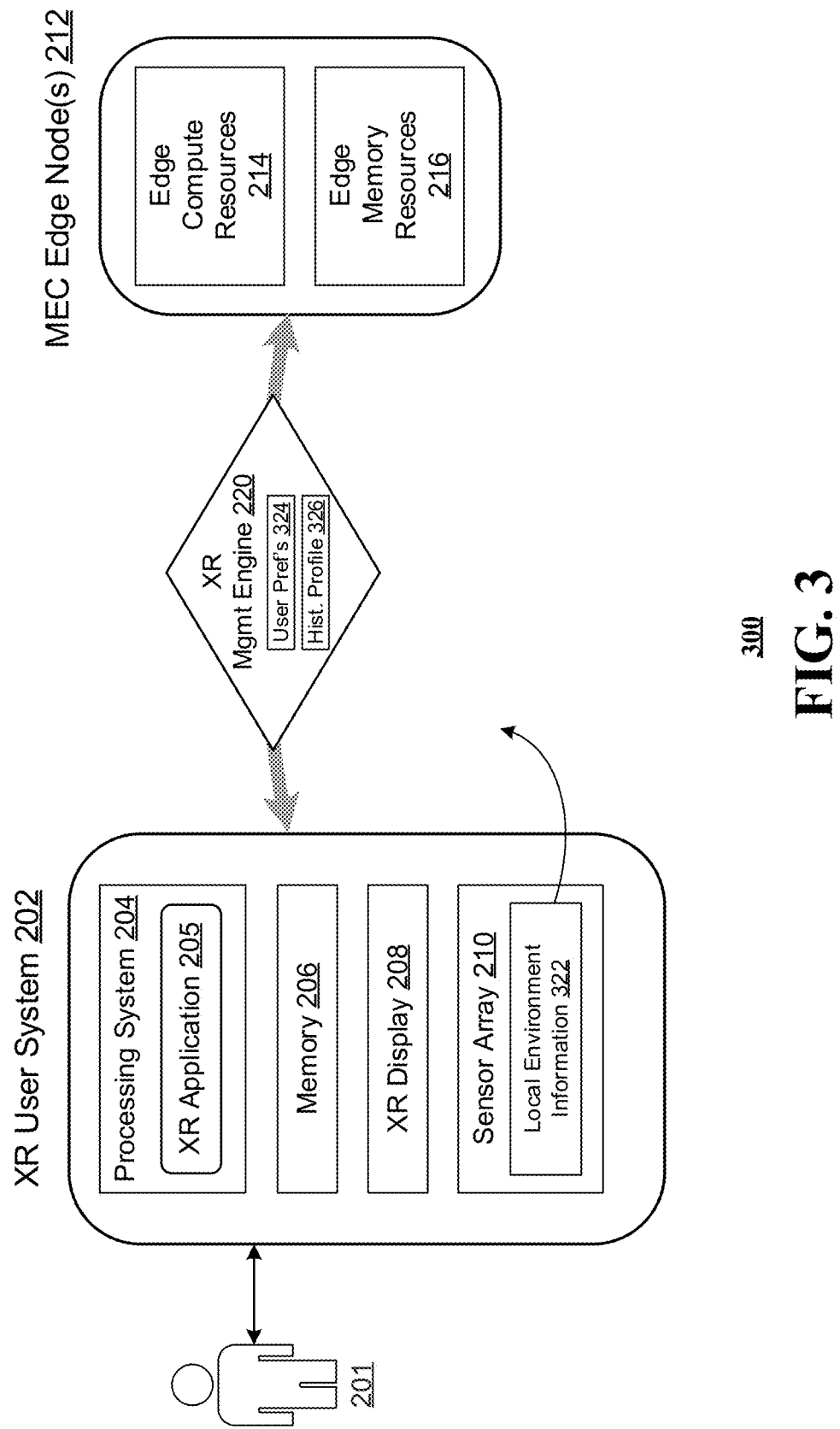
FIG. 3 is a block diagram illustrating an example, non-limiting embodiment of a second operating environment in accordance with various aspects described herein.

FIG. 3 illustrates an example of an operating environment 300 that may be representative of some embodiments. In operating environment 300, while utilizing XR user system 202 and XR application 205, user 201 may move around within a real-world environment for which XR application 205 does not have a predefined mapping to refer to in conjunction with placement of XR objects/elements within the XR environment presented to the user 201.

In order to enable XR application 205 to deliver a satisfying user experience in such a scenario, XR management engine 220 may be configured to dynamically determine aspects of the XR environment/experience in a real-time fashion. In this context, objects/elements of the XR environment may be opportunistically generated as user 201 explores the surrounding real-world environment.

As reflected in FIG. 3, sensor array 210 may generate local environment information 322 as user 201 navigates his/her surroundings while utilizing XR user system 202 and XR application 205. In some embodiments, local environment information 322 may include captured image(s)/video of the real-world environment surrounding XR user system 202. In some embodiments, local environment information 322 may include audio information comprising sound recorded during the movement of XR user system 202 within the surrounding real-world environment. The embodiments are not limited to these examples.

In some embodiments, XR management engine 220 may be configured to analyze local environment information 322 on a continual basis in order to build and maintain an enhanced scene understanding with respect to the real-world surroundings of XR user system 202. To this end, in some embodiments, based on local environment information 322, XR management engine 220 may perform 3D scanning/reconstruction in order to recognize significant aspects, objects, and/or elements in the real-world surroundings of XR user system 202. In some embodiments, for example, this may include identifying features such as doors/doorways, floors, tables, and pathways. In some embodiments, by analyzing local environment information 322, XR management engine 220 may determine the location and engagement of one or more other users of XR application 205.

In some embodiments, XR management engine 220 may be configured to perform probabilistic mapping of new XR objects within the XR environment as XR user system 202 moves around within its surrounding real-world environment. In some embodiments, XR management engine 220 may dynamically select XR objects to be mapped within the XR environment based on user preferences 324 associated with user 201. User preferences 324 may generally comprise a set of preferences regarding aspects/characteristics of the XR experience to be provided by XR application 205. In some embodiments, when user 201 utilizes XR application 205 for the first time, a bootstrap set of preferences, such as default preferences or preferences selected based on demographic information, may serve as the user preferences 324 for user 201. In some embodiments, user preferences 324 may subsequently be modified based on various factors. In some embodiments, user preferences 324 may be modified based on user input provided by user 201. In some embodiments, user preferences 324 may be modified based on behavioral actions of user 201 observed during utilization of XR application 205. In some embodiments, user preferences 324 may be modified based on information gleaned from supplemental sources such as the user's telephone and messaging activity, social media activity, photo album(s), and/or calendar. The embodiments are not limited to these examples.

In some embodiments, XR management engine 220 may dynamically select XR objects to be mapped within the XR environment based on a historical profile 326 associated with user 201. Historical profile 326 may generally comprise information describing aspects of XR environments previously generated for user 201 and aspects of user 201's behaviors in engaging with those XR environments. In some embodiments, historical profile 326 may include information indicating whether user 201 has, in the past, tended to observe, recognize, and/or interact with various types of XR objects/elements. In some embodiments, in considering whether/how to present a given XR object/element in the XR environment, XR management engine 220 may consult historical profile 326 in order to determine whether user 201 has tended to observe, recognize, and/or interact with such an XR object/element in the past. In some embodiments, if XR management engine 220 determines that a candidate XR object/element is of a type that user 201 has tended to ignore in the past, XR management engine 220 may determine not to present that XR object/element in the XR environment, or may determine to render that XR object/element at a relatively low level of quality/complexity. In some embodiments, the XR object/element to be rendered may be manipulated in size, shape, or render complexity to accommodate certain interaction physics as determined by the sensor array 210. For example, if the XR management engine 220 is required to create falling hailstones in a weather simulation, the sensor array can indicate that most of those hailstones would fall too quickly (due to physics and gravity definitions in the environment 322) or would be too dark (due to poor illumination around the active user 201) so the system 220 may render only flattened 2D images for display on 208 instead of more complex, textured 3D hailstones. In the same example the action of running by the user 201 is detected by sensor array 210 and the management engine. 220 determines insufficient resources 214 are available for a full XR weather simulation so hailstones are decreased in visual size for the XR display 208.

In some embodiments, XR management engine 220 may select compute resources from among those of a compute resource pool for use in generating XR objects. In some embodiments, the compute resource pool may include local compute resources of XR user system 202—such as may correspond to computing/processing capabilities of processing system 204—and edge compute resources of a network, such as edge compute resources 214 of one or more multi-access edge computing (MEC) edge nodes 212 of a network. In some embodiments, XR management engine 220 may select the compute resources to be used to generate a given XR object based on attributes of that XR object.

Figure 4:
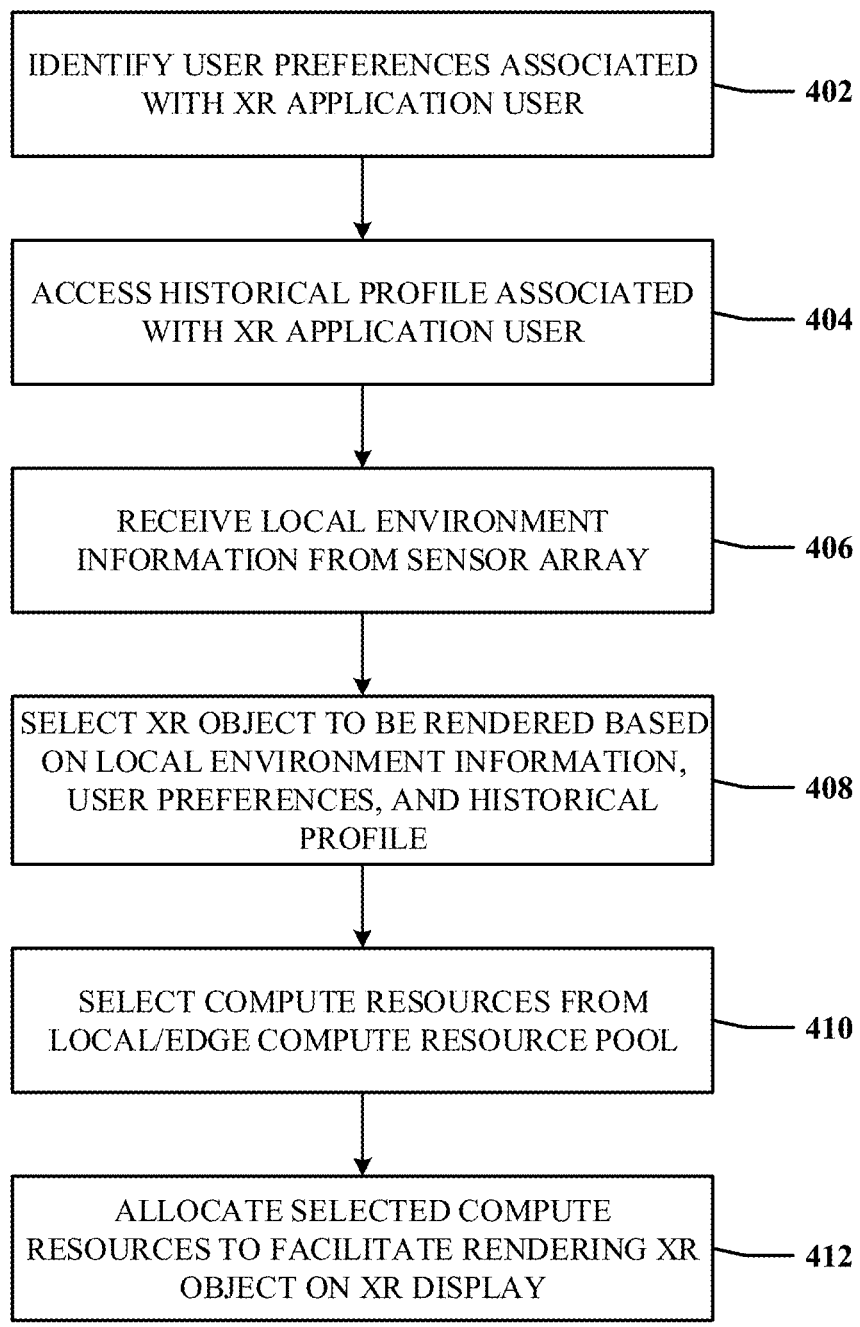
FIG. 4 depicts an illustrative embodiment of a method in accordance with various aspects described herein.

FIG. 4 depicts an illustrative embodiment of a method in accordance with various aspects described herein. While for purposes of simplicity of explanation, the respective processes are shown and described as a series of blocks in FIG. 4, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

As shown in FIG. 4, user preferences associated with an XR application user may be identified at 402. For example, in operating environment 300 of FIG. 3, XR management engine 200 may identify user preferences 324, which may be associated with user 201. At 404, a historical profile associated with the XR application user may be identified. For example, in operating environment 300 of FIG. 3, XR management engine 200 may access historical profile 326, which may be associated with user 201. At 406, local environment information may be received from a sensor array of an XR user system executing an XR application. For example, in operating environment 300 of FIG. 3, XR management engine 200 may receive local environment information 322 from XR user system 202.

At 408, an XR object to be rendered may be selected based on the local environment information received at 406, the historical profile accessed at 404, and the user preferences identified at 402. For example, in operating environment 300 of FIG. 3, XR management engine 200 may select an XR object to be rendered based on local environment information 322, user preferences 324, and historical profile 326. At 410, compute resources to be used for generating the selected XR object may be selected from a compute resource pool that includes local compute resources of the XR user system and edge compute resources of one or more edge nodes. For example, in operating environment 300 of FIG. 3, XR management engine 200 may select compute resources to be used for generating the selected XR object from a compute resource pool that includes compute resources associated with processing system 204 and edge compute resources 214 of MEC edge node(s) 212. In one embodiment, the XR management engine 200 may determine that one or more XR objects 408 should be rendered in the XR Display 208 of user 201 to enhance safety after a recent injury noted in the user's profile 404. After appropriate selection of compute resources 410, the XR management system 220 chooses a combination of 3D safety cone objects rendered by the MEC 212 and simple visual warning lines computed by the User System 202. At 412, the selected compute resources may be allocated to facilitate rendering the XR object on an XR display of the XR user system. For example, in operating environment 300 of FIG. 3, XR management engine 200 may allocate the compute resources selected at 412 to facilitate rendering the XR object selected at 408. In one embodiment, the XR Management Engine 220 may recognize that the same XR object/element 408 is heavily reused according to the user's profile 404 in the local environment 406. However, to further conserve and optimize allocation of resources from the pool 410, the Engine 220 copies a previous object rendering 408 and requests that the User Processing System 204 locally modify the object with blurring, small color changes, or other low-resource alterations. In a related embodiment, the alterations executed by the local processing system 204 are executed on behalf of the user 201 after receiving profile updates based on preferences 402 and history 404 that indicate stronger fatigue likelihoods from the Sensor Array 210. In this embodiment, one or more XR objects 408 optimize pooled resource selection 410 for fast object manipulation to improve user conditions, which may override or replace traditional optimization of local and edge resources 410. The embodiments are not limited to these examples.

Figure 5:
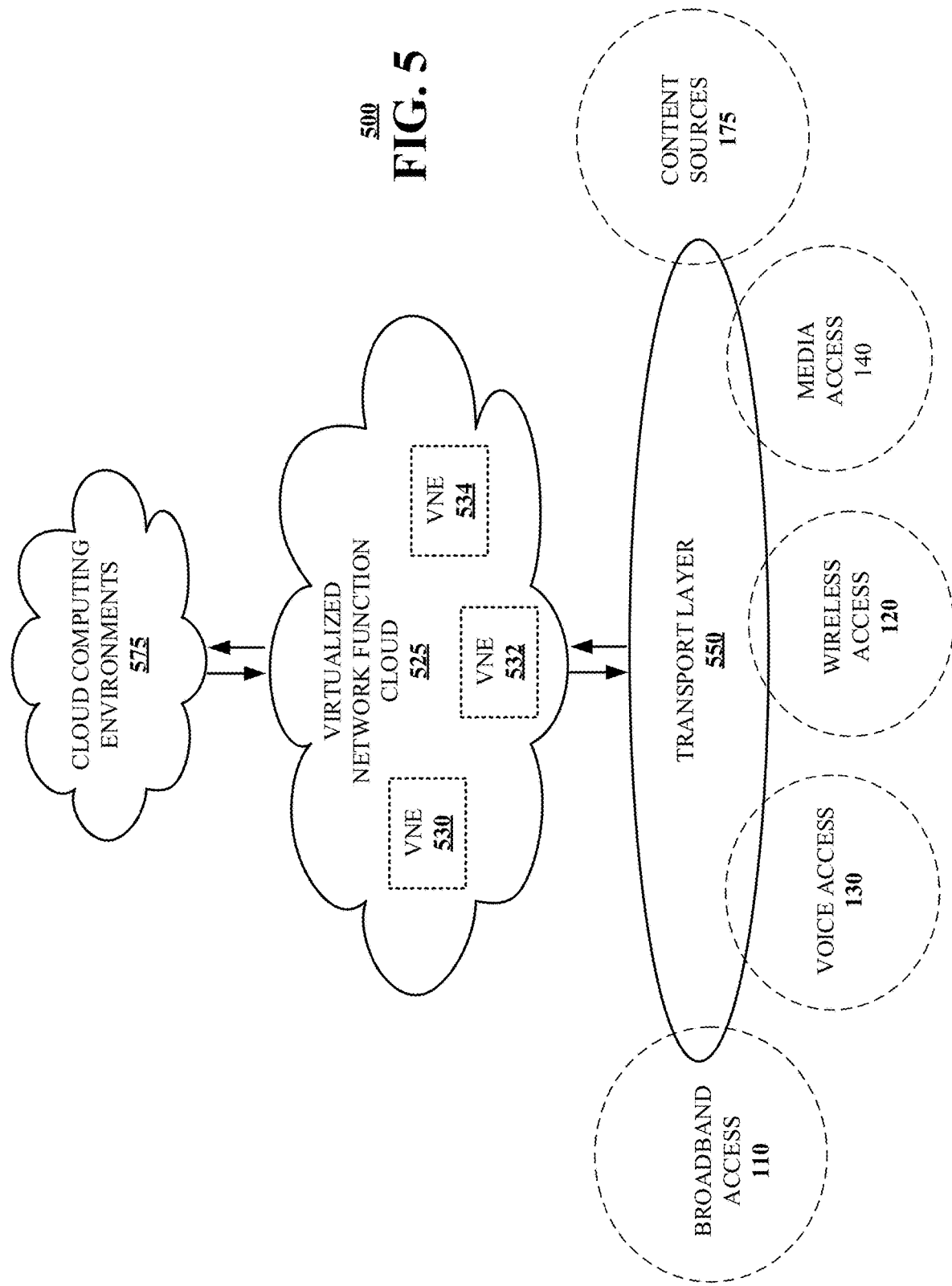
FIG. 5 is a block diagram illustrating an example, non-limiting embodiment of a virtualized communication network in accordance with various aspects described herein.

Referring now to FIG. 5, a block diagram 500 is shown illustrating an example, non-limiting embodiment of a virtualized communication network in accordance with various aspects described herein. In particular a virtualized communication network is presented that can be used to implement some or all of the subsystems and functions of system 100, the subsystems and functions of XR management engine 220 and/or MEC edge node(s) 212, and method 400 presented in FIGS. 1, 2, 3, and 4. For example, virtualized communication network 500 can facilitate in whole or in part identifying user preferences for an XR application executing at an XR user system, wherein the user preferences are associated with an XR application user, accessing a historical profile associated with the XR application user, receiving local environment information from a sensor array of the XR user system, selecting an XR object for presentation on an XR display of the XR user system based on the local environment information, the user preferences, and the historical profile, and allocating compute resources to facilitate a rendering of the XR object, wherein the allocated compute resources are selected from a compute resource pool comprising local compute resources of the XR user system and edge compute resources of a network.

In particular, a cloud networking architecture is shown that leverages cloud technologies and supports rapid innovation and scalability via a transport layer 550, a virtualized network function cloud 525 and/or one or more cloud computing environments 575. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 530, 532, 534, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 530 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 550 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 530, 532 or 534. These network elements can be included in transport layer 550.

The virtualized network function cloud 525 interfaces with the transport layer 550 to provide the VNEs 530, 532, 534, etc. to provide specific NFVs. In particular, the virtualized network function cloud 525 leverages cloud operations, applications, and architectures to support networking workloads. The virtualized network elements 530, 532 and 534 can employ network function software that provides either a one-for-one mapping of traditional network element function or alternately some combination of network functions designed for cloud computing. For example, VNEs 530, 532 and 534 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 530, 532, 534, etc. can be instantiated and managed using an orchestration approach similar to those used in cloud compute services.

The cloud computing environments 575 can interface with the virtualized network function cloud 525 via APIs that expose functional capabilities of the VNEs 530, 532, 534, etc. to provide the flexible and expanded capabilities to the virtualized network function cloud 525. In particular, network workloads may have applications distributed across the virtualized network function cloud 525 and cloud computing environment 575 and in the commercial cloud, or might simply orchestrate workloads supported entirely in NFV infrastructure from these third party locations.

Figure 6:
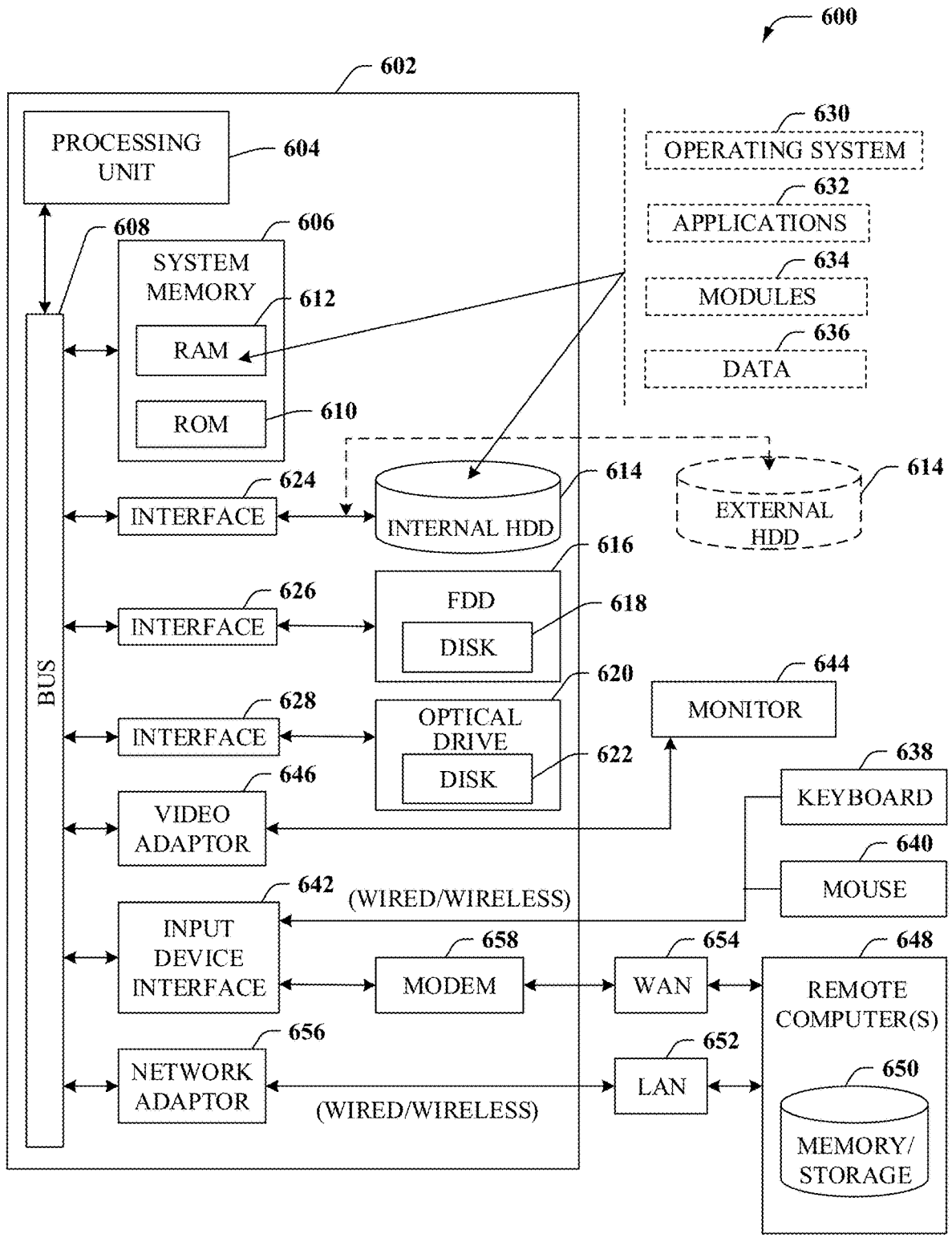
FIG. 6 is a block diagram of an example, non-limiting embodiment of a computing environment in accordance with various aspects described herein.

Turning now to FIG. 6, there is illustrated a block diagram of a computing environment in accordance with various aspects described herein. In order to provide additional context for various embodiments of the embodiments described herein, FIG. 6 and the following discussion are intended to provide a brief, general description of a suitable computing environment 600 in which the various embodiments of the subject disclosure can be implemented. In particular, computing environment 600 can be used in the implementation of network elements 150, 152, 154, 156, access terminal 112, base station or access point 122, switching device 132, media terminal 142, and/or VNEs 530, 532, 534, etc. Each of these devices can be implemented via computer-executable instructions that can run on one or more computers, and/or in combination with other program modules and/or as a combination of hardware and software. For example, computing environment 600 can facilitate in whole or in part identifying user preferences for an XR application executing at an XR user system, wherein the user preferences are associated with an XR application user, accessing a historical profile associated with the XR application user, receiving local environment information from a sensor array of the XR user system, selecting an XR object for presentation on an XR display of the XR user system based on the local environment information, the user preferences, and the historical profile, and allocating compute resources to facilitate a rendering of the XR object, wherein the allocated compute resources are selected from a compute resource pool comprising local compute resources of the XR user system and edge compute resources of a network.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 6, the example environment can comprise a computer 602, the computer 602 comprising a processing unit 604, a system memory 606 and a system bus 608. The system bus 608 couples system components including, but not limited to, the system memory 606 to the processing unit 604. The processing unit 604 can be any of various commercially available processors. Dual microprocessors and other multiprocessor architectures can also be employed as the processing unit 604. The system bus 608 can be any of several types of bus structure that can further interconnect to a memory bus (with or without a memory controller), a peripheral bus, and a local bus using any of a variety of commercially available bus architectures. The system memory 606 comprises ROM 610 and RAM 612. A basic input/output system (BIOS) can be stored in a non-volatile memory such as ROM, erasable programmable read only memory (EPROM), EEPROM, which BIOS contains the basic routines that help to transfer information between elements within the computer 602, such as during startup. The RAM 612 can also comprise a high-speed RAM such as static RAM for caching data.

The computer 602 further comprises an internal hard disk drive (HDD) 614 (e.g., EIDE, SATA), which internal HDD 614 can also be configured for external use in a suitable chassis (not shown), a magnetic floppy disk drive (FDD) 616, (e.g., to read from or write to a removable diskette 618) and an optical disk drive 620, (e.g., reading a CD-ROM disk 622 or, to read from or write to other high capacity optical media such as the DVD). The HDD 614, magnetic FDD 616 and optical disk drive 620 can be connected to the system bus 608 by a hard disk drive interface 624, a magnetic disk drive interface 626 and an optical drive interface 628, respectively. The hard disk drive interface 624 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 602, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 612, comprising an operating system 630, one or more application programs 632, other program modules 634 and program data 636. All or portions of the operating system, applications, modules, and/or data can also be cached in the RAM 612. The systems and methods described herein can be implemented utilizing various commercially available operating systems or combinations of operating systems.

A user can enter commands and information into the computer 602 through one or more wired/wireless input devices, e.g., a keyboard 638 and a pointing device, such as a mouse 640. Other input devices (not shown) can comprise a microphone, an infrared (IR) remote control, a joystick, a game pad, a stylus pen, touch screen or the like. These and other input devices are often connected to the processing unit 604 through an input device interface 642 that can be coupled to the system bus 608, but can be connected by other interfaces, such as a parallel port, an IEEE 1394 serial port, a game port, a universal serial bus (USB) port, an IR interface, etc.

A monitor 644 or other type of display device can be also connected to the system bus 608 via an interface, such as a video adapter 646. It will also be appreciated that in alternative embodiments, a monitor 644 can also be any display device (e.g., another computer having a display, a smart phone, a tablet computer, etc.) for receiving display information associated with computer 602 via any communication means, including via the Internet and cloud-based networks. In addition to the monitor 644, a computer typically comprises other peripheral output devices (not shown), such as speakers, printers, etc.

The computer 602 can operate in a networked environment using logical connections via wired and/or wireless communications to one or more remote computers, such as a remote computer(s) 648. The remote computer(s) 648 can be a workstation, a server computer, a router, a personal computer, portable computer, microprocessor-based entertainment appliance, a peer device or other common network node, and typically comprises many or all of the elements described relative to the computer 602, although, for purposes of brevity, only a remote memory/storage device 650 is illustrated. The logical connections depicted comprise wired/wireless connectivity to a local area network (LAN) 652 and/or larger networks, e.g., a wide area network (WAN) 654. Such LAN and WAN networking environments are commonplace in offices and companies, and facilitate enterprise-wide computer networks, such as intranets, all of which can connect to a global communications network, e.g., the Internet.

When used in a LAN networking environment, the computer 602 can be connected to the LAN 652 through a wired and/or wireless communication network interface or adapter 656. The adapter 656 can facilitate wired or wireless communication to the LAN 652, which can also comprise a wireless AP disposed thereon for communicating with the adapter 656.

When used in a WAN networking environment, the computer 602 can comprise a modem 658 or can be connected to a communications server on the WAN 654 or has other means for establishing communications over the WAN 654, such as by way of the Internet. The modem 658, which can be internal or external and a wired or wireless device, can be connected to the system bus 608 via the input device interface 642. In a networked environment, program modules depicted relative to the computer 602 or portions thereof, can be stored in the remote memory/storage device 650. It will be appreciated that the network connections shown are example and other means of establishing a communications link between the computers can be used.

The computer 602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 7:
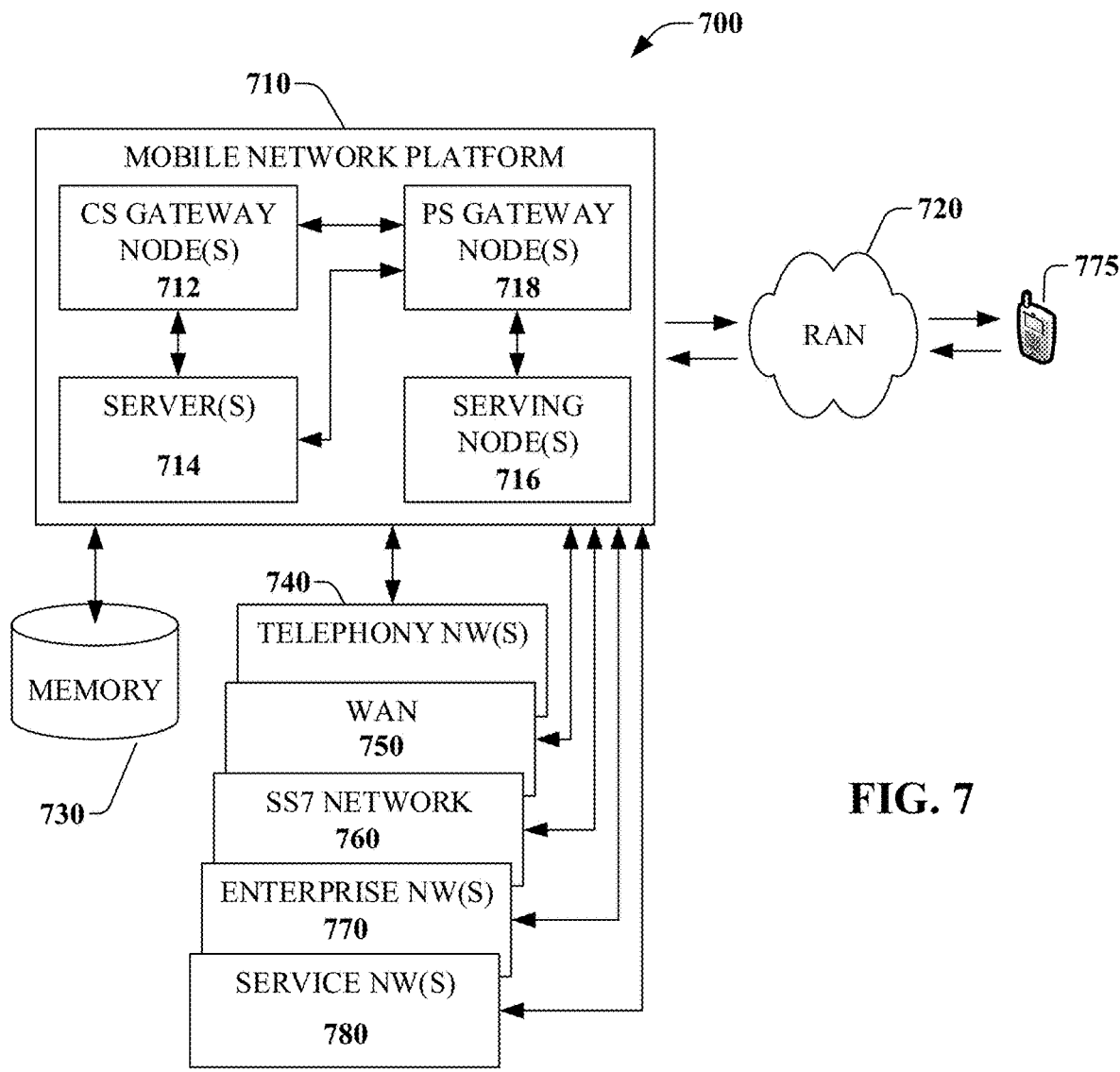
FIG. 7 is a block diagram of an example, non-limiting embodiment of a mobile network platform in accordance with various aspects described herein.

Turning now to FIG. 7, an embodiment 700 of a mobile network platform 710 is shown that is an example of network elements 150, 152, 154, 156, and/or VNEs 530, 532, 534, etc. For example, platform 710 can facilitate in whole or in part identifying user preferences for an XR application executing at an XR user system, wherein the user preferences are associated with an XR application user, accessing a historical profile associated with the XR application user, receiving local environment information from a sensor array of the XR user system, selecting an XR object for presentation on an XR display of the XR user system based on the local environment information, the user preferences, and the historical profile, and allocating compute resources to facilitate a rendering of the XR object, wherein the allocated compute resources are selected from a compute resource pool comprising local compute resources of the XR user system and edge compute resources of a network. In one or more embodiments, the mobile network platform 710 can generate and receive signals transmitted and received by base stations or access points such as base station or access point 122. Generally, mobile network platform 710 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 710 can be included in telecommunications carrier networks, and can be considered carrier-side components as discussed elsewhere herein. Mobile network platform 710 comprises CS gateway node(s) 712 which can interface CS traffic received from legacy networks like telephony network(s) 740 (e.g., public switched telephone network (PSTN), or public land mobile network (PLMN)) or a signaling system #7 (SS7) network 760. CS gateway node(s) 712 can authorize and authenticate traffic (e.g., voice) arising from such networks. Additionally, CS gateway node(s) 712 can access mobility, or roaming, data generated through SS7 network 760; for instance, mobility data stored in a visited location register (VLR), which can reside in memory 730. Moreover, CS gateway node(s) 712 interfaces CS-based traffic and signaling and PS gateway node(s) 718. As an example, in a 3GPP UMTS network, CS gateway node(s) 712 can be realized at least in part in gateway GPRS support node(s) (GGSN). It should be appreciated that functionality and specific operation of CS gateway node(s) 712, PS gateway node(s) 718, and serving node(s) 716, is provided and dictated by radio technology(ies) utilized by mobile network platform 710 for telecommunication over a radio access network 720 with other devices, such as a radiotelephone 775.

In addition to receiving and processing CS-switched traffic and signaling, PS gateway node(s) 718 can authorize and authenticate PS-based data sessions with served mobile devices. Data sessions can comprise traffic, or content(s), exchanged with networks external to the mobile network platform 710, like wide area network(s) (WANs) 750, enterprise network(s) 770, and service network(s) 780, which can be embodied in local area network(s) (LANs), can also be interfaced with mobile network platform 710 through PS gateway node(s) 718. It is to be noted that WANs 750 and enterprise network(s) 770 can embody, at least in part, a service network(s) like IP multimedia subsystem (IMS). Based on radio technology layer(s) available in technology resource(s) or radio access network 720, PS gateway node(s) 718 can generate packet data protocol contexts when a data session is established; other data structures that facilitate routing of packetized data also can be generated. To that end, in an aspect, PS gateway node(s) 718 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 700, mobile network platform 710 also comprises serving node(s) 716 that, based upon available radio technology layer(s) within technology resource(s) in the radio access network 720, convey the various packetized flows of data streams received through PS gateway node(s) 718. It is to be noted that for technology resource(s) that rely primarily on CS communication, server node(s) can deliver traffic without reliance on PS gateway node(s) 718; for example, server node(s) can embody at least in part a mobile switching center. As an example, in a 3GPP UMTS network, serving node(s) 716 can be embodied in serving GPRS support node(s) (SGSN).

For radio technologies that exploit packetized communication, server(s) 714 in mobile network platform 710 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 710. Data streams (e.g., content(s) that are part of a voice call or data session) can be conveyed to PS gateway node(s) 718 for authorization/authentication and initiation of a data session, and to serving node(s) 716 for communication thereafter. In addition to application server, server(s) 714 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 710 to ensure network's operation and data integrity in addition to authorization and authentication procedures that CS gateway node(s) 712 and PS gateway node(s) 718 can enact. Moreover, provisioning server(s) can provision services from external network(s) like networks operated by a disparate service provider; for instance, WAN 750 or Global Positioning System (GPS) network(s) (not shown). Provisioning server(s) can also provision coverage through networks associated to mobile network platform 710 (e.g., deployed and operated by the same service provider), such as the distributed antennas networks shown in FIG. 1(s) that enhance wireless service coverage by providing more network coverage.

It is to be noted that server(s) 714 can comprise one or more processors configured to confer at least in part the functionality of mobile network platform 710. To that end, the one or more processor can execute code instructions stored in memory 730, for example. It is should be appreciated that server(s) 714 can comprise a content manager, which operates in substantially the same manner as described hereinbefore.

In example embodiment 700, memory 730 can store information related to operation of mobile network platform 710. Other operational information can comprise provisioning information of mobile devices served through mobile network platform 710, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 730 can also store information from at least one of telephony network(s) 740, WAN 750, SS7 network 760, or enterprise network(s) 770. In an aspect, memory 730 can be, for example, accessed as part of a data store component or as a remotely connected memory store.

In order to provide a context for the various aspects of the disclosed subject matter, FIG. 7, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 8:
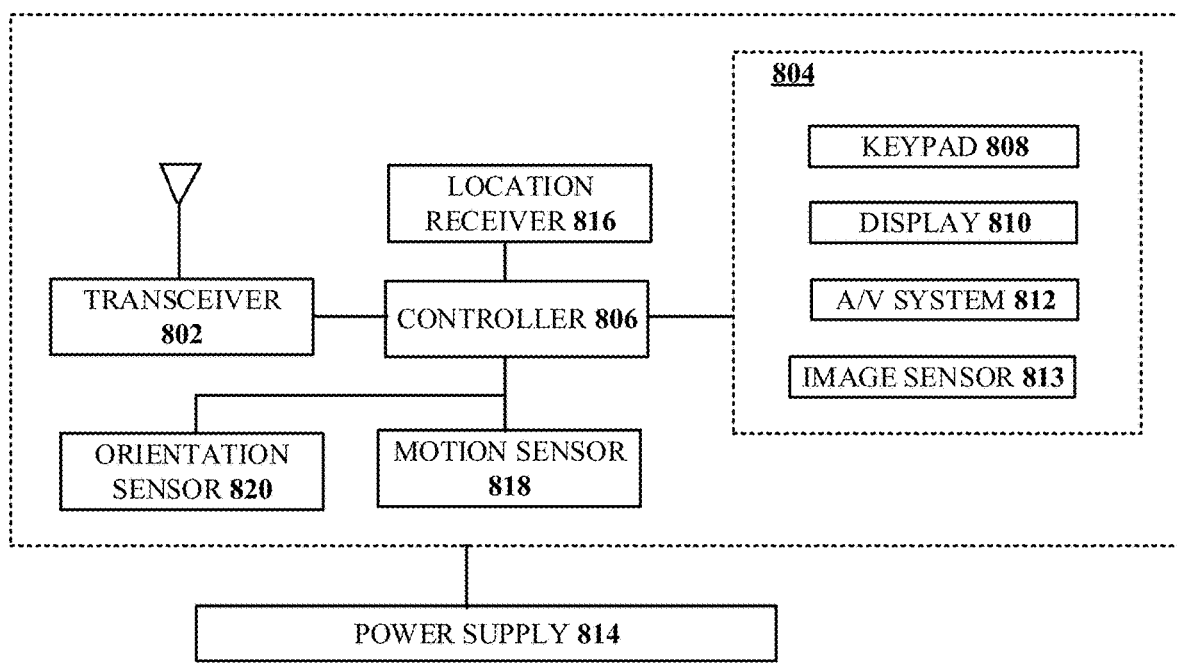
FIG. 8 is a block diagram of an example, non-limiting embodiment of a communication device in accordance with various aspects described herein.

Turning now to FIG. 8, an illustrative embodiment of a communication device 800 is shown. The communication device 800 can serve as an illustrative embodiment of devices such as data terminals 114, mobile devices 124, vehicle 126, display devices 144 or other client devices for communication via either communications network 125. For example, computing device 800 can facilitate in whole or in part identifying user preferences for an XR application executing at an XR user system, wherein the user preferences are associated with an XR application user, accessing a historical profile associated with the XR application user, receiving local environment information from a sensor array of the XR user system, selecting an XR object for presentation on an XR display of the XR user system based on the local environment information, the user preferences, and the historical profile, and allocating compute resources to facilitate a rendering of the XR object, wherein the allocated compute resources are selected from a compute resource pool comprising local compute resources of the XR user system and edge compute resources of a network.

The communication device 800 can comprise a wireline and/or wireless transceiver 802 (herein transceiver 802), a user interface (UI) 804, a power supply 814, a location receiver 816, a motion sensor 818, an orientation sensor 820, and a controller 806 for managing operations thereof. The transceiver 802 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 802 can also be adapted to support circuit-switched wireline access technologies (such as PSTN), packet-switched wireline access technologies (such as TCP/IP, VoIP, etc.), and combinations thereof.

The UI 804 can include a depressible or touch-sensitive keypad 808 with a navigation mechanism such as a roller ball, a joystick, a mouse, or a navigation disk for manipulating operations of the communication device 800. The keypad 808 can be an integral part of a housing assembly of the communication device 800 or an independent device operably coupled thereto by a tethered wireline interface (such as a USB cable) or a wireless interface supporting for example Bluetooth®. The keypad 808 can represent a numeric keypad commonly used by phones, and/or a QWERTY keypad with alphanumeric keys. The UI 804 can further include a display 810 such as monochrome or color LCD (Liquid Crystal Display), OLED (Organic Light Emitting Diode) or other suitable display technology for conveying images to an end user of the communication device 800. In an embodiment where the display 810 is touch-sensitive, a portion or all of the keypad 808 can be presented by way of the display 810 with navigation features.

The display 810 can use touch screen technology to also serve as a user interface for detecting user input. As a touch screen display, the communication device 800 can be adapted to present a user interface having graphical user interface (GUI) elements that can be selected by a user with a touch of a finger. The display 810 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 810 can be an integral part of the housing assembly of the communication device 800 or an independent device communicatively coupled thereto by a tethered wireline interface (such as a cable) or a wireless interface.

The UI 804 can also include an audio system 812 that utilizes audio technology for conveying low volume audio (such as audio heard in proximity of a human ear) and high volume audio (such as speakerphone for hands free operation). The audio system 812 can further include a microphone for receiving audible signals of an end user. The audio system 812 can also be used for voice recognition applications. The UI 804 can further include an image sensor 813 such as a charged coupled device (CCD) camera for capturing still or moving images.

The power supply 814 can utilize common power management technologies such as replaceable and rechargeable batteries, supply regulation technologies, and/or charging system technologies for supplying energy to the components of the communication device 800 to facilitate long-range or short-range portable communications. Alternatively, or in combination, the charging system can utilize external power sources such as DC power supplied over a physical interface such as a USB port or other suitable tethering technologies.

The location receiver 816 can utilize location technology such as a global positioning system (GPS) receiver capable of assisted GPS for identifying a location of the communication device 800 based on signals generated by a constellation of GPS satellites, which can be used for facilitating location services such as navigation. The motion sensor 818 can utilize motion sensing technology such as an accelerometer, a gyroscope, or other suitable motion sensing technology to detect motion of the communication device 800 in three-dimensional space. The orientation sensor 820 can utilize orientation sensing technology such as a magnetometer to detect the orientation of the communication device 800 (north, south, west, and east, as well as combined orientations in degrees, minutes, or other suitable orientation metrics).

The communication device 800 can use the transceiver 802 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 806 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 800.

Other components not shown in FIG. 8 can be used in one or more embodiments of the subject disclosure. For instance, the communication device 800 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," "data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," "data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. An extended reality (XR) management system, comprising:
   a processing system including a processor; and
   a memory that stores executable instructions that, when executed by the processing system, facilitate performance of operations, the operations comprising:
      accessing a historical profile associated with an XR application user;
      determining whether an XR application does not have a predefined mapping to refer to in conjunction with placement of XR objects within an XR environment presented to the XR application user, wherein the XR environment includes a real-world environment in which the XR application user moves around;
      in response to the determining that the XR application does not have the predefined mapping: determining compute resources to generate local environment information from a sensor array of an XR user system, wherein generating the local environment information includes identifying elements within the real-world environment, and wherein the compute resources comprise the XR user system and edge compute resources of a network;
      based on the local environment information and the historical profile associated with the XR application user, selecting a first XR object and a second XR object for presentation on an XR display of the XR user system;
      determining, based on the local environment information, that the first XR object is to be rendered using compute resources of the XR user system, and that the second XR object is to be rendered using the edge compute resources of the network;
      rendering the first XR object using the compute resources of the XR user system;
      receiving the second XR object having been rendered by the edge compute resources of the network; and
      presenting the first XR object and the second XR object on the XR display of the XR system.

2. The XR management system of claim 1, wherein the first XR object and the second XR object are further selected based on user preferences for the XR application, wherein the user preferences are associated with the XR application user.

3. The XR management system of claim 2, wherein the operations further comprise updating the user preferences based on received user input.

4. The XR management system of claim 1, wherein the determining that the second XR object is to be rendered using the edge compute resources of the network is based on attributes of the second XR object.

5. The XR management system of claim 1, wherein the first XR object comprises an advertisement.

6. The XR management system of claim 1, wherein the local environment information includes captured images of the real-world environment surrounding the XR user system.

7. The XR management system of claim 1, wherein the XR user system comprises an optical head-mounted display.

8. The XR management system of claim 1, wherein the rendering of the first XR object comprises:
   identifying a previously-generated XR object based on which to generate the first XR object;
   causing the compute resources of the XR user system to modify render data associated with the previously-generated XR object, resulting in modified render data with low-resource alterations; and
   generating render data for the first XR object based on the modified render data.

9. A non-transitory machine-readable storage medium, comprising executable instructions that, when executed by a processing system including a processor, facilitate performance of operations, the operations comprising:
   identifying user preferences for an extended reality (XR) application executing at an XR user system, wherein the user preferences are associated with an XR application user;
   determining whether the XR application does not have a predefined mapping to refer to in conjunction with placement of XR objects within an XR environment presented to the XR application user, wherein the XR environment includes a real-world environment in which the XR application user moves around;
   in response to the determining that the XR application does not have the predefined mapping:
   determining compute resources to generate local environment information from a sensor array of the XR user system, wherein generating the local environment information includes identifying elements within the real-world environment, and wherein the compute resources comprise the XR user system and edge compute resources of a network;
   based on the local environment information and the user preferences associated with the XR application user, selecting a first XR object and a second XR object for presentation on an XR display of the XR user system;
   determining, based on the local environment information, that the first XR object is to be rendered using compute resources of the XR user system, and that the second XR object is to be rendered using the edge compute resources of the network;
   rendering the first XR object using the compute resources of the XR user system;
   receiving the second XR object having been rendered by the edge compute resources of the network; and
   presenting the first XR object and the second XR object on the XR display of the XR system.

10. The non-transitory machine-readable storage medium of claim 9, wherein the first XR object and the second XR object are further selected based on user preferences associated with the XR application user.

11. The non-transitory machine-readable storage medium of claim 9, wherein the determining that the second XR object is to be rendered using the edge compute resources of the network is based on attributes of the second XR object.

12. The non-transitory machine-readable storage medium of claim 9, wherein the operations further comprise updating the user preferences based on received user input.

13. The non-transitory machine-readable storage medium of claim 9, wherein the first XR object comprises an advertisement.

14. The non-transitory machine-readable storage medium of claim 9, wherein the local environment information includes captured images of the real-world environment surrounding the XR user system.

15. The non-transitory machine-readable storage medium of claim 9, wherein the XR user system comprises an optical head-mounted display.

16. A method, comprising:
   identifying, by a processing system including a processor, user preferences for an extended reality (XR) application executing at an XR user system, wherein the user preferences are associated with an XR application user;
   accessing, by the processing system, a historical profile associated with the XR application user;
   determining, by the processing system, whether the XR application does not have a predefined mapping to refer to in conjunction with placement of XR objects within an XR environment presented to the XR application user, wherein the XR environment includes a real-world environment in which the XR application user moves around;
   in response to the determining that the XR application does not have the predefined mapping: determining, by the processing system, compute resources to generate local environment information from a sensor array of the XR user system, wherein generating the local environment information includes identifying elements within the real-world environment, and wherein the compute resources comprise the XR user system and edge compute resources of a network;
   based on the local environment information, the user preferences, and the historical profile, selecting, by the processing system, a first XR object and a second XR object for presentation on an XR display of the XR user system;
   determining, by the processing system, based on the local environment information, that the first XR object is to be rendered using compute resources of the XR user system, and that the second XR object is to be rendered using the edge compute resources of the network;
   rendering, by the processing system, the first XR object using the compute resources of the XR user system;
   receiving, by the processing system, the second XR object having been rendered by the edge compute resources of the network; and
   presenting, by the processing system, the first XR object and the second XR object on the XR display of the XR system.

17. The method of claim 16, wherein the determining that the second XR object is to be rendered using the edge compute resources of the network is based on attributes of the second XR object.

18. The method of claim 16, further comprising updating the user preferences, by the processing system, based on received user input.

19. The method of claim 16, wherein the first XR object comprises an advertisement.

20. The method of claim 19, wherein the local environment information includes captured images of the real-world environment surrounding the XR user system.

\* \* \* \* \*